United States Patent
Ko et al.

(10) Patent No.: US 9,749,815 B2
(45) Date of Patent: Aug. 29, 2017

(54) NODE AND A METHOD OF COMMUNICATING AMONG A PLURALITY OF NODES IN CONTENT-CENTRIC NETWORKING ENVIRONMENT

(71) Applicant: AJOU UNIVERSITY INDUSTRY-ACADEMIC COOPERATION FOUNDATION, Gyeonggi-do (KR)

(72) Inventors: Young Bae Ko, Gyeonggi-do (KR); Jae Bum Kim, Gyeonggi-do (KR); Daewook Shin, Gyeonggi-do (KR)

(73) Assignee: AJOU UNIVERSITY INDUSTRY-ACADEMIC COOPERATION FOUNDATION, Gyeonggi-do (KR)

( * ) Notice: Subject to any disclaimer, the term of this patent is extended or adjusted under 35 U.S.C. 154(b) by 76 days.

(21) Appl. No.: 14/641,559

(22) Filed: Mar. 9, 2015

(65) Prior Publication Data

US 2016/0165406 A1    Jun. 9, 2016

Related U.S. Application Data

(60) Provisional application No. 62/089,798, filed on Dec. 9, 2014.

(51) Int. Cl.
*H04W 4/06* (2009.01)
*H04L 12/733* (2013.01)
*H04L 12/751* (2013.01)

(52) U.S. Cl.
CPC .............. *H04W 4/06* (2013.01); *H04L 45/20* (2013.01); *H04L 45/02* (2013.01)

(58) Field of Classification Search
None
See application file for complete search history.

(56) References Cited

U.S. PATENT DOCUMENTS

| 8,175,101 B2* | 5/2012 | Park | H04L 12/1881 370/395.4 |
| 2009/0073910 A1* | 3/2009 | Yagyu | H04W 40/246 370/312 |

(Continued)

FOREIGN PATENT DOCUMENTS

KR    1020130080626 A    7/2013

OTHER PUBLICATIONS

Kim et al.,TOP-CCN:Topology aware Content Centric Networking for Mobile Ad Hoc Networks, Dec. 2013, IEEE.*

(Continued)

*Primary Examiner* — Tejis Daya
(74) *Attorney, Agent, or Firm* — Ladas & Parry LLP

(57) ABSTRACT

In a method for communicating among a plurality of nodes in a content-centric networking environment, each of a plurality of nodes selects at least one relay node based on topology information on neighbor nodes adjacent within 2 hops from itself. Each of the selected relay nodes determines whether itself is a publisher relay node. Each of the determined publisher relay nodes generates a multi-hop content announce (CA) message including content information of its own 1-hop neighbor nodes, and broadcasts the multi-hop CA message to the plurality of nodes through the selected relay nodes.

17 Claims, 9 Drawing Sheets

(56) References Cited

U.S. PATENT DOCUMENTS

2012/0257545 A1* 10/2012 Al Agha ................ H04L 45/00
                                                         370/255
2013/0279398 A1* 10/2013 Cha ...................... H04W 84/18
                                                         370/315

OTHER PUBLICATIONS

Baccelli et al. OSPF Multipoint Relay (MPR) Extension for Ad Hoc Networks, Feb. 2009, RFC 5449.*
Sung-Won Lee; "A Lightweight Prefix-based Routing for Content-Centric Networking", Graduate School of Information and Communication, Jul. 2013, pp. 656-660.
Korean Office Action Appln. No. 10-2013-0146863; Dated Nov. 1, 2014.

* cited by examiner

○ NORMAL NODE

----▶ 1-HOP CA MESSAGE BROADCAST
BY EACH NODE

○ NORMAL NODE

▓ RELAY NODE

○ NORMAL NODE
● RELAY NODE

○ NORMAL NODE
● RELAY NODE
◐ PUBLISHER RELAY NODE

NODE AND A METHOD OF COMMUNICATING AMONG A PLURALITY OF NODES IN CONTENT-CENTRIC NETWORKING ENVIRONMENT

BACKGROUND

The inventive concept relates to a node and a method for communicating among a plurality of nodes in a content-centric networking environment, and more particularly, to a node and a method for communicating among a plurality of nodes in a content-centric networking environment, which enable efficient communication.

As host-centric networking technologies based on Internet protocol (IP) that is the basis of the Internet does not currently coincide with the tendency that Internet traffics are explosively increased due to an increase in demand for moving picture content services, a content-centric networking technology has been proposed as a new networking architecture.

The content-centric networking technology is a technology which enables a user to bring a desired content from the closest place by using, as an address for networking, the name of the content rather than an Internet address representing the position of a host device, based on that the main usage of the Internet is the request and distribution of contents in order to efficiently process traffics. The content-centric networking technology does not require connectivity between terminals, and can avoid the non-efficiency of data repetitive transmission due to caching of nodes constituting a network. In addition, the content-centric networking technology enables a problem of routing loop not to occur. Thus, the content-centric networking technology has come into the spotlight as a new networking architecture.

As the Internet connection environment of users is changed into a mobile environment, studies have recently been actively conducted to implement features of the content-concentric networking technology in not only a wired environment in which nodes constituting a network are fixed but also a mobile ad-hoc network in which content providers or all nodes constituting the network can have mobility.

SUMMARY

An aspect of the inventive concept is directed to a node and a method for communicating among a plurality of nodes in a content-centric networking environment, which can reduce broadcast overhead between nodes and enable efficient transmission of content information and data.

According to an embodiment of the inventive concept, there is provided a method for communicating among a plurality of nodes in a content-centric networking environment, the method including: selecting, by each of a plurality of nodes, at least one relay node based on topology information on neighbor nodes adjacent within 2 hops from itself; determining, by each of the selected relay nodes, whether itself is a publisher relay node; and generating, by each of the determined publisher relay nodes, a multi-hop content announce (CA) message including content information of its own 1-hop neighbor nodes, and broadcasting the multi-hop CA message to the plurality of nodes through the selected relay nodes.

According to another embodiment of the inventive concept, there is provided a node for implementing a content-centric networking environment, the node including: a topology information storage unit for storing topology information on neighbor nodes adjacent within 2 hops from the node; a relay node selection unit for selecting at least one relay node among 1-hop neighbor nodes based on the topology information; and a publisher relay node determination unit for determining whether the node is a publisher relay node broadcasting a multi-hop CA message on behalf of the 1-hop neighbor nodes.

BRIEF DESCRIPTION OF THE DRAWINGS

Exemplary embodiments of the inventive concept will be more clearly understood from the following detailed description taken in conjunction with the accompanying drawings in which.

DETAILED DESCRIPTION OF EXEMPLARY EMBODIMENTS

Figure 1A:
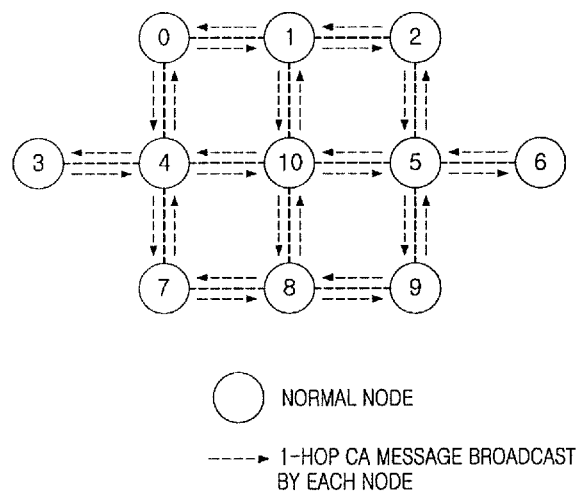
FIGS. 1A to 1H are conceptual diagrams sequentially illustrating a network to which a method for communicating among a plurality of nodes in a content-centric networking environment is applied according to an embodiment of the inventive concept.

Exemplary embodiments of the inventive concept will be described below in detail with reference to the accompanying drawings. Wherever possible, the same reference numerals will be used to refer to the same elements throughout the specification, and a duplicated description thereof will be omitted.

The embodiments of the inventive concept are provided only for illustrative purposes and for full understanding of the scope of the inventive concept by those skilled in the art. The following embodiments may be modified in various forms, but should not be interpreted to be limited thereto. Rather, these embodiments are provided so that this invention will be thorough and complete, and will fully convey the scope of the invention to those skilled in the art.

When it is determined that a detailed description is related to a related known function or configuration which may make the purpose of the inventive concept unnecessarily ambiguous in the description, such detailed description will be omitted. Also, terminologies used herein are used to appropriately describe the exemplary embodiments and thus may be changed depending on a user, the intent of an operator, or a custom. Accordingly, the terminologies must be viewed based on the following overall description of this specification. Like reference numerals proposed in each drawing denote like components.

A dichotomous transmission method of interests and data is used in a content-centric networking environment. That is, in the content-centric networking environment, there is used a "content request→content transmission" method in which, if a node, e.g., a terminal capable of providing caching transmits an interest (i.e., request or query) message based on the name of a desired content, a node having the content transmits data including the corresponding content to the node that requests the content.

When the content-centric networking environment is implemented in a mobile ad-hoc network (MANET) autonomously configured among nodes dynamically changed without any help of a fixed network, all types of messages including an interest message and the like are transmitted to all nodes in a broadcast manner due to characteristics of the MANET. That is, the all types of messages are flooded through each node, to be transmitted to all the nodes.

When the content-centric network environment is implemented in the MANET due to broadcast characteristics of the MANET, each node participates in message retransmission, and hence channel competition and collision probability increase. Therefore, the performance of the entire network may be deteriorated.

In order to solve the problem described above, the inventive concept provides a node and a method for communicating among a plurality of nodes in the content-centric networking environment. Hereinafter, embodiments of the inventive concept will be described by assuming that the content-centric networking environment is implemented in the MANET. However, the inventive concept is not limited thereto, and it will be readily understood by those skilled in the art that the inventive concept may be applied to networks except the MANET.

FIGS. 1A to 1H are conceptual diagrams sequentially illustrating a network to which a method for communicating among a plurality of nodes in a content-centric networking environment is applied according to an embodiment of the inventive concept. In FIGS. 1A to 1H, it has been illustrated that the network are configured with nodes 0 to 10. However, the inventive concept is not limited thereto, and the network may have a larger number of nodes. Each of the nodes 0 to 10 has a wireless interface, and may be a device that can simultaneously satisfy the mobile computing function of a host and the routing function of a router. Each of the nodes 0 to 10 may be a device such as a mobile phone, a notebook computer, a tablet PC, a PDA or a mobile device having a sensor.

Referring to FIG. 1A, each of the nodes 0 to 10 transmits its own content announce (hereinafter, 'CA') to a 1-hop neighbor node, and receives a CA message of the 1-hop neighbor node from the 1-hop neighbor node. For example, in the case of the node 0, the node 0 transmits its own CA message to the nodes 1 to 4, and receives CA messages of the nodes 1 to 4 from the respective nodes 1 to 4. In this state, the flooding scope of the CA message is limited to one hop.

The CA message may include information on a node transmitting the CA message and information on a 1-hop neighbor node of the node transmitting the CA message. For example, the CA message may include content information (Content Prefix) of itself transmitting the CA message, identification information (ID), cache-hit ratio information (Cache-hit Ratio), node type information (Type), hop count information (HOP Count), and message type information (CA Type) with respect to the node itself transmitting the CA message.

The content information (Content Prefix) is information on a content stored in a corresponding node, and may include, for example, the name of the content, the name of a content provider, and the like. The identification information (ID) may be information for distinguishing nodes from each other, and may be, for example, a MAC address. The cache-hit ratio information (Cache-hit Ratio) is information representing how often its own the content is referred by another node, and may be information including a ratio between a content request number of the entire network and a content reply number of the node. The node type information (Type) may be information for determining whether the corresponding node is a relay node. The hop count information (HOP Count) may be information on the number of hops where the CA message is forwarded through nodes. The message type information (CA Type) may be information for determining whether the flooding scope of the CA message is one hop or two hops or more (i.e., a multi-hop CA message).

The CA message may include content information list (Neighbor Content Prefix List), identification information list (Neighbor ID List), and node type information list (Neighbor Type List) with respect to a 1-hop neighbor node of the node transmitting the CA message. That is, the CA message may include the listed content information, identification information and node type information of the 1-hop neighbor node.

The CA message may be arbitrarily generated by the node transmitting the same. For example, in order that each node notifies a result obtained by selecting a relay node among its own 1-hop neighbor nodes as shown in FIG. 1E to be described later, a CA message in which, after the relay node is selected, the node type of the selected relay node is changed in the node type information list (Neighbor Type List) of the 1-hop neighbor nodes may be generated. However, the inventive concept is not limited thereto, and the CA message may be generated in a predetermined period.

Each of the nodes 0 to 10 generates topology information based on the CA message received from the 1-hop neighbor node, and stores the topology information.

The topology information may be information on neighbor nodes adjacent within 2 hops from a corresponding node itself. For example, the topology information may include information on a 1-hop neighbor node of the corresponding node and information on a 2-hop neighbor node connected through the 1-hop neighbor node. The information on the 1-hop neighbor node may include content information, identification information, cache-hit ratio information, and the like with respect to the node transmitting the CA message. The information on the 2-hop neighbor node may include content information list, identification information list and type information list with respect to the 1-hop neighbor node of the node transmitting the CA message. The topology information may be updated whenever the corresponding node receives a CA message.

For example, in the case of the node 0, the node 0 may generate and store topology information including information on the nodes 1 and 4 that are 1-hop neighbor nodes and information on the nodes 2, 3, 7 and 10 that are 2-hop neighbor nodes, based on CA messages of the nodes 1 and 4 from the nodes 1 and 4.

Figure 1B:
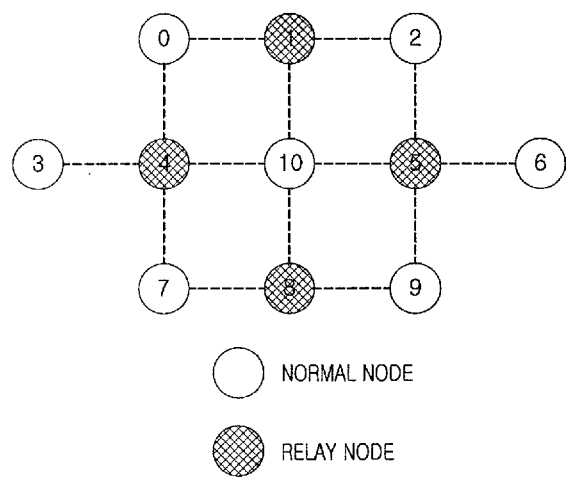
Figure 1C:
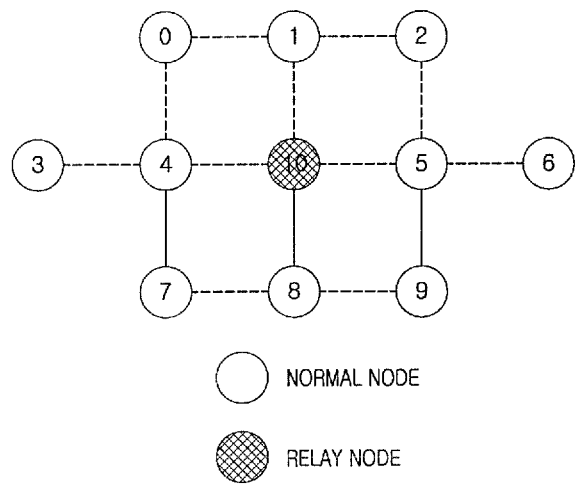
Figure 1D:
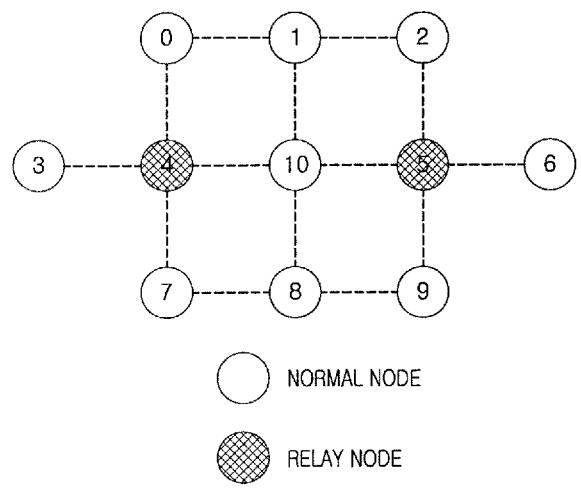
Figure 1E:
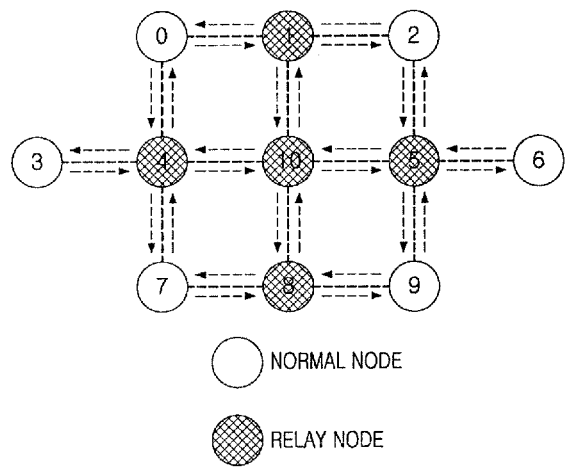

Referring to FIGS. 1B to 1D, each of the nodes 0 to 10 selects at least one relay node among its own 1-hop neighbor nodes based on its own topology information. The relay node is a node that allows an interest message and a data message, transmitted from the node selecting the relay node, not to be distributed and flooded to other nodes but to be intensively flooded through the node itself.

The relay node selection process will be described in detail. First, each of the nodes 0 to 10 calculates an MPRcost of each of its own 1-hop neighbor nodes, and selects, as the relay node, a node having the greatest MPRcost among its own 1-hop neighbor nodes.

The MPRcost may be expressed by Equation 1.

$$\text{MPRcost}(i) = (1-\alpha) \cdot 2h\text{Ratio}(i) + \alpha \cdot \text{CachehitRatio}(i) \qquad \text{Equation 1}$$

In Equation 1, i represents an i-th 1-hop neighbor node of a specific node (any one of the nodes 0 to 10). 2hRatio(i) represents a ratio between a number of 2-hop neighbor nodes of the specific node and a number of 1-hop neighbor nodes belonging to the i-th 1-hop neighbor node of the specific node. CachehitRatio(i) represents a content reply ratio between a content request number of the entire network and the i-th 1-hop neighbor node of the node. $\alpha$ represents a weight coefficient. $\alpha$ may be greater than or equal to 0 and smaller than and equal to 1. Accordingly, MPRcost may be calculated based on at least one of 2hRatio(i) and CachehitRatio(i).

Subsequently, each of the nodes 0 to 10 removes the information on the 2-hop neighbor nodes connected through the selected relay node from its own topology information. That is, each of the nodes 0 to 10 removes the information on the 2-hop neighbor nodes connected through the selected relay node from the content information list, the identification information list and the type information list with respect to the 2-hop neighbor nodes, included in its own topology information.

Each of the nodes 0 to 10 repeats the relay node selection process described above until the information on the 2-hop neighbor nodes is entirely removed from its own topology information.

The relay node selection process will be described using, as an example, the case of the node 0 in FIG. 1B showing a result by selecting relay nodes of the nodes 0, 2, 7 and 9. In FIG. 1B, for convenience of illustration, it is assumed that the MPRcost of each of the nodes 1 and 4 is calculated based on only 2hRatio ($\alpha=0$). This is the same in FIGS. 1C and 1D.

The node 0 calculates an MPRcost of each of the nodes 1 and 4 that are 1-hop neighbor nodes. The number of 2-hop neighbor nodes of the node 0 is 4 (the nodes 2, 3, 7 and 10), the number of 1-hop neighbor nodes of the node 1 is 2 (the nodes 2 and 10), and the number of 1-hop neighbor nodes of the node 4 is 3 (the nodes 3, 7 and 10). Therefore, the MPRcost of the node 1 is $2/4$, and the MPRcost of the node 4 is $3/4$.

The node 0 selects, as a relay node, the node 4 having the greatest MPRcost, and removes information on the 2-hop neighbor nodes (the nodes 3, 7 and 10) connected through the node 4 from its own topology information.

Since information on the node 2 among the information on the 2-hop neighbor nodes exists in the topology information, the node 0 again selects a relay node. The node 0 selects, as a relay node, the node 1 that is a 1-hop neighbor node, and removes the information on the node 2 among the information on the 2-hop neighbor nodes from its own topology information.

Similarly, the node 2 selects the nodes 1 and 5 as relay nodes, the node 7 selects the nodes 4 and 8 as relay nodes, and the node 9 selects the nodes 5 and 8 as relay nodes. Each of the nodes 2, 7 and 9 entirely removes information on 2-hop neighbor nodes from its own topology information.

Another relay node selection process will be described using, as an example, the case of the node 1 in FIG. 1C showing a result obtained by selecting relay nodes of the nodes 1, 4, 5 and 8.

The node 1 calculates an MPRcost of each of the nodes 0, 2 and 10 that are 1-hop neighbor nodes. The number of 2-hop neighbor nodes of the node 1 is 3 (the nodes 4, 5 and 8), the number of 1-hop neighbor nodes of the node 0 is 1 (the node 4), the number of 1-hop neighbor nodes of the node 2 is 1 (the node 5), and the number of 1-hop neighbor nodes of the node 10 is 3 (the nodes 4, 5 and 8). Therefore, the MPRcost of the node 0 is $1/3$, the MPRcost of the node 2 is $1/3$, and the MPRcost of the node 10 is 1.

The node 1 selects, as a relay node, the node 10 having the greatest MPRcost, and removes information on the 2-hop neighbor nodes (the nodes 4, 5 and 8) connected through the node 10 from its own topology information.

Since information on the 2-hop neighbor nodes is entirely removed from the topology information, the node 10 does not additionally select any relay node.

Similarly, each of the nodes 4, 5 and 8 also selects the node 10 as a relay node, and entirely removes information on the 2-hop neighbor nodes from its own topology information.

Still another relay node selection process will be described using, as an example, the case of the node 3 in FIG. 1D showing a result obtained by selecting relay nodes of the nodes 3 and 6.

Since the node 3 has only the node 4 as a 1-hop neighbor node, the node 3 selects the node 4 as a relay node, and removes information on the nodes 0, 7 and 10 that are 2-hop neighbor nodes from its own topology information. Similarly, the node 6 selects the node 5 as a relay node, and removes information on the nodes 2, 9 and 10 that are 2-hop neighbor nodes from its own topology information.

Referring to FIG. 1E, each of the nodes 0 to 10 transmits, to its own 1-hop neighbor node, a CA message to which the relay node selection result is reflected. Specifically, each of the nodes 0 to 10 generates a CA message in which the node type information of the selected relay node is changed in the node type information list (Neighbor Type List) of its own 1-hop neighbor node, and transmits the changed CA message to its own 1-hop neighbor node. Each of the nodes 0 to 10 receives, from its own 1-hop neighbor node, a CA message to which the relay node selection result of its own 1-hop neighbor node is reflected. Like the CA message described in FIG. 1A, the flooding hop scope is limited to 1 hop in the CA messages to which the relay node selection result is reflected.

Each of the nodes 0 to 10 may identify the CA message received from its own 1-hop neighbor node, and update its own node type information (Type). Each of the nodes 0 to 10 may retransmit the CA message received from the node selecting itself as a relay node to the node selecting itself as the relay node.

As such, the interest message and the data messages are not flooded by all the nodes 0 to 10 in the network but flooded by the nodes 1, 4, 5, 8 and 10 selected as the relay nodes, so that, when the interest message and the data message are transmitted, interference, confusion and collision probability can be reduced in the network. Thus, the performance of the network can be enhanced.

Figure 1F:
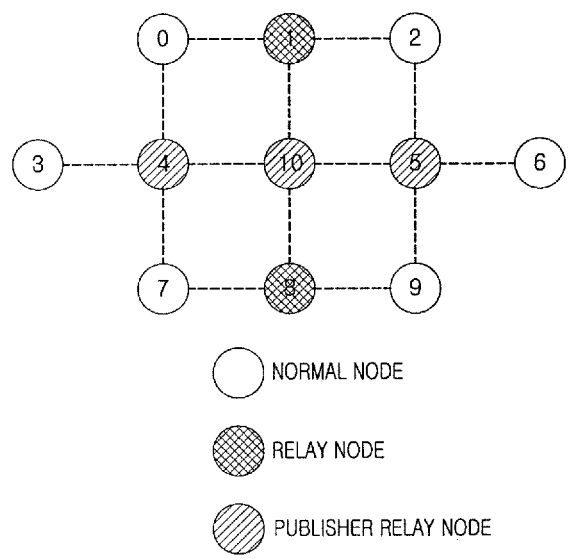

Referring to FIG. 1F, each of the nodes 1, 4, 5, 8 and 10 selected as the relay nodes among the nodes 0 to 10 determines whether itself is a publisher relay node. The publisher relay node is a node that allows all nodes not to broadcast a CA message to the entire network. The publisher relay node generates a multi-hop CA message including content information on its own 1-hop neighbor nodes, and broadcasts the multi-hop CA message to the entire network on behalf of its own 1-hop neighbor nodes. Similarly to the CA message described in FIGS. 1A and 1E, the multi-hop CA message may include information on a node transmitting the multi-hop CA message and information on 1-hop neighbor nodes of the node transmitting the multi-hop CA message. The multi-hop CA message is different from the CA message described in FIGS. 1A and 1E in that the message type information (CA Type) represents 2 hops or more.

The publisher relay node determination process will be described in detail. First, each of the nodes 1, 4, 5, 8 and 10 selected as the relay nodes determines whether another node selected as the relay node exists among its own 1-hop neighbor nodes.

If another node selected as the relay node exists among its own 1-hop neighbor nodes, each of the nodes 1, 4, 5, 8 and 10 compares the number of its own 1-hop neighbor nodes with the number of 1-hop neighbor nodes of the node selected as the relay node. When the number of its own 1-hop neighbor nodes is greater than or equal to that of 1-hop neighbor nodes of the node selected as the relay node, each of the nodes 1, 4, 5, 8 and 10 determines itself as a publisher relay node. If another node selected as the relay node does not exist among its own 1-hop neighbor nodes, each of the nodes 1, 4, 5, 8 and 10 determines itself as a publisher relay node. Each of the nodes 1, 4, 5, 8 and 10 may compare the number of its own 1-hop neighbor nodes with that of 1-hop neighbor nodes of the node selected as the relay node, based on its own topology information.

The relay node determined as a publisher relay node generates a multi-hop CA message by changing the message type information (CA Type) in its own CA message, and broadcasts the multi-hop CA message to all the nodes constituting the network through adjacent relay nodes.

The publisher relay node determination process will be described using, as an example, the case of the node 4 among the nodes 1, 4, 5, 8 and 10 selected as the relay nodes. The node 4 has the node 10 selected as the relay node among its own 1-hop neighbor nodes. Since the number of 1-hop neighbor nodes of the node 4 is equal to that of 1-hop neighbor nodes of the node 10, the node 4 determines itself as a publisher relay node. Similarly, the node 5 also determines itself as a publisher relay node.

The publisher relay node determination process will be described using, as an example, the case of the node 1 among the nodes 1, 4, 5, 8 and 10 selected as the relay nodes. The node 1 has the node 10 selected as the relay node among its own 1-hop neighbor nodes. Since the number of 1-hop neighbor nodes of the node 1 is smaller than that of 1-hop neighbor nodes of the node 10, the node 1 does not determine itself as a publisher relay node. Similarly, the node 8 does not also determine itself as a publisher relay node.

The publisher relay node determination process will be described using, as an example, the case of the node 10 among the nodes 1, 4, 5, 8 and 10 selected as the relay nodes. The node 10 has all the 1-hop neighbor nodes selected as the relay nodes. Since the number of 1-hop neighbor nodes of the node 10 is greater than that of 1-hop neighbor nodes of each of the nodes 1 and 8 and equal to that of 1-hop neighbor nodes of each of the nodes 4 and 5, the node 10 determines itself as a publisher relay node.

Each of the determined nodes 4, 5 and 10 generates a multi-hop CA message, and broadcasts the multi-hop CA message to all the nodes of the network through adjacent relay nodes. It will be apparent that each of the determined publisher relay nodes 4, 5 and 10 may transmit the multi-hop CA message to an adjacent normal node.

Meanwhile, when each of the relay nodes 1 and 8 not selected as publisher relay nodes does not receive a multi-hop CA message including its own content information within a predetermined time, each of the relay nodes 1 and 8 may determine itself as a publisher relay node. That is, when each of the relay nodes 1 and 8 does not receive the multi-hop CA message including its own content information, each of the relay nodes 1 and 8 generates a multi-hop CA message by changing the message type information (CA Type) in its own CA message, and broadcasts the generated multi-hop CA message to all the nodes constituting the network through adjacent relay nodes. Accordingly, the content information of each node can be accurately maintained in the network.

Figure 1G:
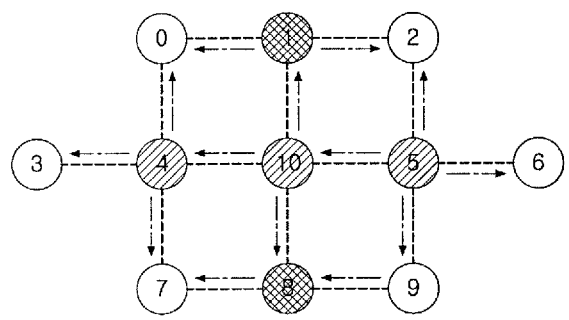

FIG. 1G illustrates a case where the publisher relay node 5 broadcasts a multi-hop CA message. Referring to FIG. 1G, the multi-hop CA message generated and broadcast by the publisher relay node 5 may be transmitted to the normal nodes 0, 3 and 7 via the relay nodes 10 and 4. The multi-hop CA message may be transmitted to the normal node 1 or 2 via the relay nodes 10 and 1. The multi-hop CA message may be transmitted to the node 7 or 9 via the relay nodes 10 and 8. The multi-hop CA message may be directly transmitted to the normal node 2, 6 and 9. Similarly, the multi-hop CA message generated and broadcast by each of the publisher relay nodes 4 and 10 may also be transmitted to all the nodes of the network.

As such, each of all the nodes constituting the network does not broadcast a CA message to the entire network, and only each of the nodes determined as the publisher relay nodes broadcasts a multi-hop CA message including content information of an adjacent neighbor node to the entire network, so that it is possible to reduce broadcast overhead. Thus, a problem caused by broadcast storming or the like can be prevented in the network, and the performance of the network can be enhanced.

Figure 1H:
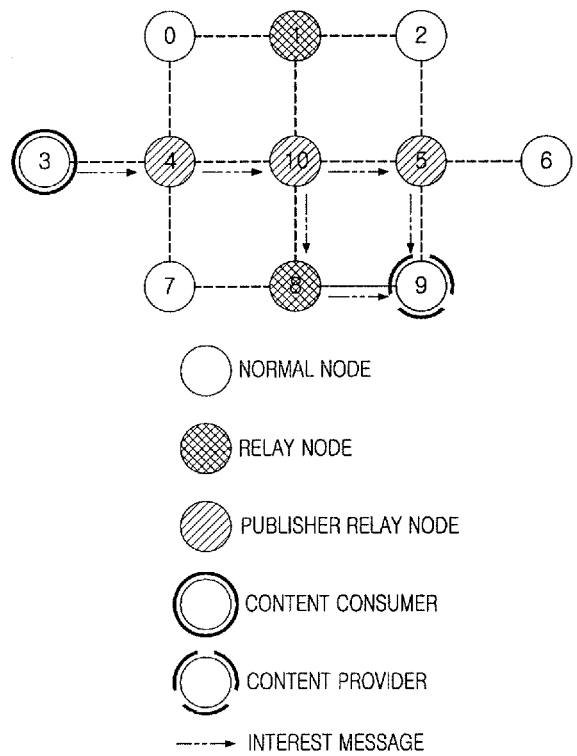

FIG. 1H is a conceptual diagram illustrating flooding of an interest message transmitted by the node 3. In FIG. 1H, it is assumed that the node 3 is a content consumer, the node 9 is a content provider that provides a content requested by the node 3, and a multi-hop CA message including content information of the node 9 is broadcast by the node 5 as shown in FIG. 1G, so that the node 3 receives the multi-hop CA message.

Referring to FIG. 1H, the node 3 estimates a distance to the node 9 that is a content provider based on a multi-hop CA message broadcast by the node 5, thereby determining a hop scope of an interest message. Specifically, the node 3 identifies that the content provider requested by the node 3 is the node 9, based on 1-hop neighbor node content information list (i.e., content information of the node 9) of the node 5, included in the multi-hop CA message. The node 3 estimates a distance to the node 9 based on hop count information (HOP Count) included in the multi-hop CA message, and sets a hop scope (4 hops) of its own interest message to correspond to the estimated distance. For example, the node 3 may change estimation hop count information (Expected HOP) to correspond to the estimated distance in its own interest message.

Subsequently, the node 3 broadcasts an interest message having the flooding hop scope as 4 hops. Accordingly, the interest message broadcast by the node 3 is not flooded to nodes having 4 hops or more. As described with reference to FIGS. 1A to 1E, the interest message is transmitted to the node 9 that is the content provider through the relay nodes 4, 5, 8 and 10.

Similarly, when the node 9 receiving the interest message transmits a data message, the flooding hop scope may be limited based on the hop scope of the interest message. In this case, the node 9 may change the estimation hop count information (Expected HOP) to correspond to the hop scope of the interest message in its own data message.

As such, when any one of the nodes 0 to 10 broadcasts an interest message for requesting a content, the flooding hop scope is limited based on a multi-hop CA message transmitted through the publisher relay nodes 4, 5, 9 and 10.

Accordingly, it is possible to prevent an interest message from being transmitted without limitation, thereby reducing broadcast overhead of the network.

Figure 2:
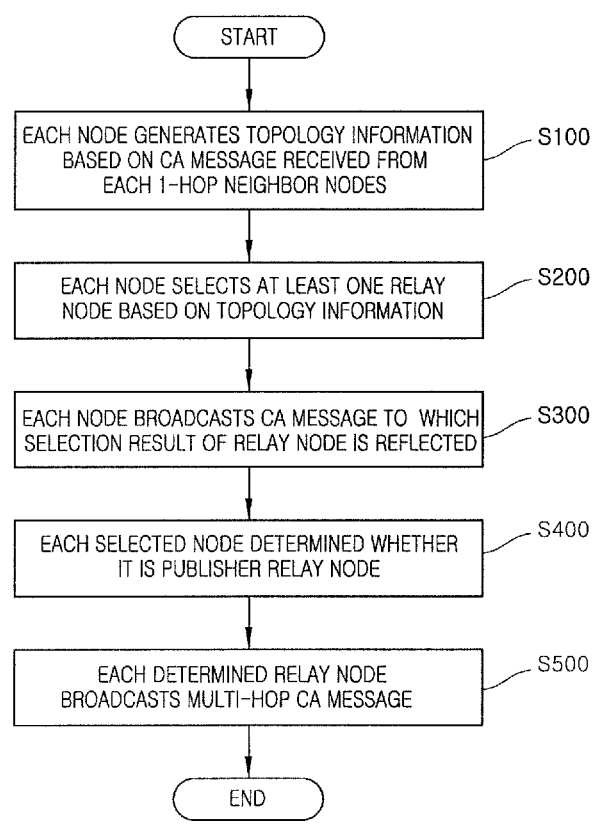
FIG. 2 is a flowchart illustrating the method according to the embodiment of the inventive concept.
Figure 3:
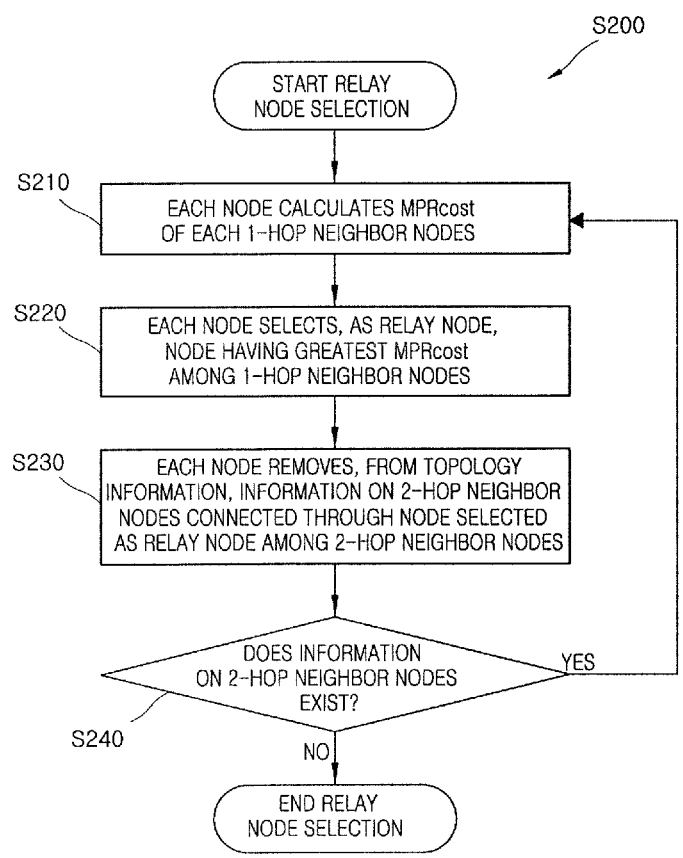
FIG. 3 is a flowchart illustrating a step of selecting a relay node(s) in FIG. 2 according to the embodiment of the inventive concept.
Figure 4:
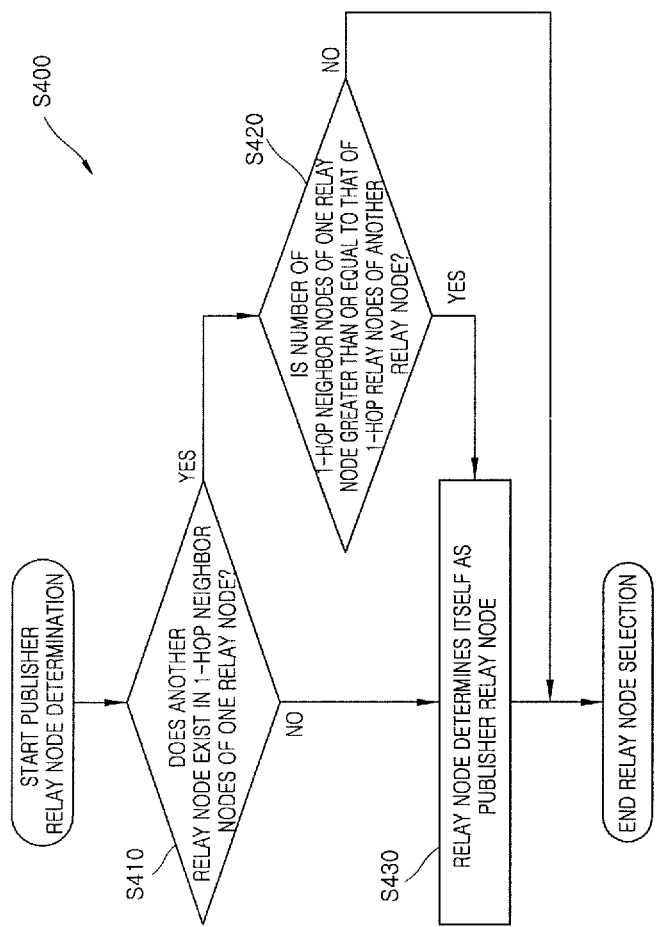
FIG. 4 is a flowchart illustrating a step of selecting a publisher relay node(s) in FIG. 2 according to the embodiment of the inventive concept.

FIG. 2 is a flowchart illustrating the method according to the embodiment of the inventive concept. FIG. 3 is a flowchart illustrating a step of selecting at least one relay node in FIG. 2 according to the embodiment of the inventive concept. FIG. 4 is a flowchart illustrating a step of selecting at least one publisher relay node in FIG. 2 according to the embodiment of the inventive concept. In FIGS. 2 to 4, for convenience of illustration, portions overlapping with those in FIGS. 1A to 1H will be briefly described.

First, each of a plurality of nodes implementing the content-centric networking environment generates topology information on information on adjacent neighbor nodes within 2 hops from itself, based on a CA message received from each 1-hop neighbor node (S100). Here, the flooding scope of the CA message is limited to 1 hop.

Subsequently, each of the plurality of nodes selects at least one relay node among its own 1-hop neighbor nodes, based on its own topology information (S200).

The relay node selection process will be described in detail with reference to FIG. 3. Each of the plurality of nodes calculates an MPRcost of each of its own 1-hop neighbor nodes (S210), and selects, as the relay node, a node having the greatest MPRcost among its own 1-hop neighbor nodes (S220). Subsequently, each of the plurality of nodes removes information on 2-hop neighbor nodes connected through the selected relay node from its own topology information (S230). Each of the plurality of nodes determines whether the information on the 2-hop neighbor nodes exists in its own topology information, and repeats steps S210 to S230 until the information on the 2-hop neighbor nodes is entirely removed from its own topology information (S240).

Each of the plurality of nodes broadcasts a CA message to which the relay node selection result is reflected to its own 1-hop neighbor nodes (S300). Accordingly, each of the plurality of nodes can identify whether itself is a relay node. Here, the flooding scope of the CA message to which the relay node selection result is reflected is limited 1 hop.

Each of the nodes selected as the relay nodes among the plurality of nodes determines whether itself is a publisher relay node (S400).

The publisher relay node determination process will be described with reference to FIG. 4. Each of the nodes selected as the relay nodes determines whether another node selected as the relay node exists among its own 1-hop neighbor nodes (S410). When another node selected as the relay node exists among the 1-hop neighbor nodes, each of the nodes selected as the relay nodes determines whether the number of its own 1-hop neighbor nodes is greater than or equal to that of 1-hop neighbor nodes of a node selected as the relay node among its own 1-hop neighbor nodes (S420). If the number of 1-hop neighbor nodes of each of the nodes selected as the relay nodes is greater than or equal to that of 1-hop neighbor nodes of the node selected as the relay node among its own 1-hop neighbor nodes, each of the nodes selected as the relay nodes determines itself as a publisher relay node (S430). If the number of 1-hop neighbor nodes of each of the nodes selected as the relay nodes is smaller than that of 1-hop neighbor nodes of the node selected as the relay node among its own 1-hop neighbor nodes, each of the nodes selected as the relay nodes does not determines itself as a publisher relay node, and ends the publisher relay node selection process.

When another node selected as the relay node does not exist among the 1-hop neighbor nodes, each of the nodes selected as the relay nodes determines itself as a publisher node (S430), and ends the publisher relay node selection process.

Each of the nodes determined as the publisher relay nodes among the nodes selected as the relay nodes generates a multi-hop CA message, and broadcasts the multi-hop CA message to all the nodes of the network through adjacent relay nodes (S500).

As such, in the inventive concept, some of nodes in the network, e.g., the MANET are selected as relay nodes so that an interest message and a data message are transmitted, and publisher relay nodes are selected from the relay nodes so that only the publisher relay nodes generates and broadcasts a multi-hop CA message flooded to the entire network. Accordingly, it is possible to prevent channel confusion and collision due to broadcast characteristics of the MANET and to reduce broadcast overhead.

Figure 5:
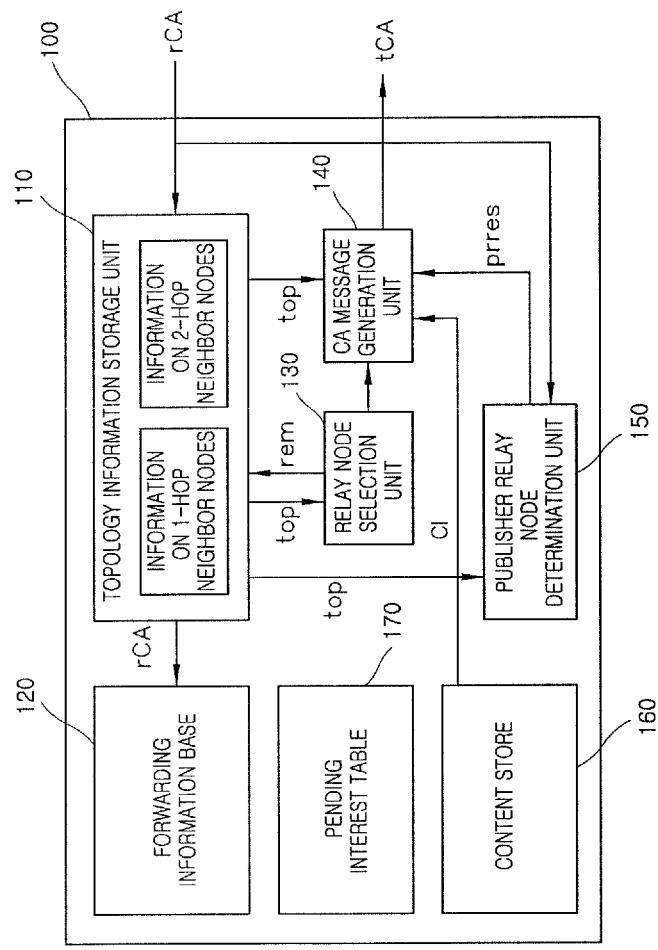
FIG. 5 is a functional block diagram of a node for implementing the content-centric network environment according to an embodiment of the inventive concept.

FIG. 5 is a functional block diagram of a node 100 for implementing the content-centric network environment according to an embodiment of the inventive concept. In FIG. 5, for convenience of illustration, portions overlapping with those in FIGS. 1A to 4 will be briefly described.

Referring to FIG. 5, the node 100 may include a topology information storage unit 110, a forwarding information base 120, a relay node selection unit 130, a CA message generation unit 140, a publisher relay node determination unit 150, a content store 160 and a pending interest table 170. Although not shown in this figure, the node 100 may have an incoming face for receiving a CA message from another node, and an outgoing face for transmitting a CA message to another node. Here, the face may be expressed as an interface.

The topology information storage unit 110 may store topology information top on neighbor nodes adjacent within 2 hops from the node 100. The topology information top may include information on 1-hop neighbor nodes, e.g., content information, identification information, cache-hit ratio information, and the like with respect to 1-hop neighbor nodes. The topology information may include information on 2-hop neighbor nodes connected through the 1-hop neighbor nodes, e.g., content information list, identification list, and the like with respect to 2-hop neighbor nodes.

The topology information storage unit 110 may generate and store topology information top based on a CA message rCA received from another node. In some embodiments, the topology information storage unit 110 may be configured with a filter unit (not shown) for filtering some information in the CA message rCA received from the other node and a memory unit (not shown) for storing the filtered information as the topology information.

The topology information storage unit 110 may transmit the CA message rCA received from the other node to the forwarding information base 120.

The forwarding information base 120 may store at least some information included in the CA message rCA received from the other node and face information, and allow the node 100 to forward a CA message, etc. to another node based on the stored information.

The relay node selection unit 130 may select, as at least one relay node, a node having the greatest MPRcost among the 1-hop neighbor nodes of the node 100, based on the topology information top stored in the topology information storage unit 110. Although not shown in this figure, the relay node selection unit 130 may include an MPRcost calculation unit for calculating an MPRcost of each 1-hop neighbor node based on the topology information top of the node 100, a selection unit for selecting at least one relay node by comparing MPRcosts of the 1-hop neighbor nodes of the node 100, and a controller for determining whether a relay node is continuously selected by identifying information on 2-hop neighbor nodes of the node 100 in the topology information storage unit 110, and generating a signal rem for controlling the change in the information on the 2-hop neighbor nodes of the node 100.

The CA message generation unit 140 may generate a CA message tCA for notifying another node of information on the node 100. The CA message generation unit 140 may receive content information CI of the node, and the like from the content store 160, and receive the topology information, thereby generating the CA message tCA. The CA message tCA may include content information, identification information, cache-hit ratio information, node type information, message type information, and the like with respect to the node 100, and content information list, identification information list, node type information list, and the like with respect to 1-hop neighbor nodes of the node 100.

If relay node selection result information rres is received from the relay node selection unit 130, the CA message generation unit 140 may generate the CA message tCA in which the type information of a node selected as a relay node is changed in the node type information list of the 1-hop neighbor nodes of the node 100, based on the relay node selection result information rres.

If publisher relay node determination result information prres is received from the publisher relay node determination unit 150, the CA message generation unit 140 may generate the CA message tCA in which the message type information of the node 100 is changed based on the publisher relay node determination result information prres.

The CA message generation unit 140 may arbitrarily generate the CA message tCA as such when the relay node selection result information rres or publisher relay node determination result information prres is received. However, the inventive concept is not limited thereto, and the CA message generation unit 140 may periodically generate the CA message tCA.

If another node receives the CA message rCA in which the result obtained by selecting the node 100 as a relay node is reflected, the publisher relay node determination unit 150 may determine whether the node 100 is a publisher relay node.

When the node 100 is selected as a relay node, the publisher relay node determination unit 150 may determine the node 100 as a publisher relay node by comparing the number of 1-hop neighbor nodes of the node 100 with that of 1-hop neighbor nodes of another relay node among the 1-hop neighbor nodes of the node 100, based on the topology information top.

When the node 100 is selected as the relay node but is not determined as the publisher relay node, the publisher relay node determination unit 150 may determine the node 100 as the publisher relay node, if the CA message rCA including the information of the node 100 is not received from another node during a predetermined period.

The publisher relay node determination unit 150 may transmit the publisher relay node determination result information pyres to the CA message generation unit 140.

The content store 160 may store a data content and a content list. When an interest message on the name of the stored content is received, the content store 160 may allow a reply to be immediately made.

The pending interest table 170 may record and manage that the interest message is transmitted to a node capable of transmitting a content as a relay to the received interest message and then input/output to/from any face (not shown). Accordingly, the pending interest table 170 enables a data message to be transmitted along a path opposite to that where the interest message passes.

As such, the node 100 prevents channel confusion and collision and reduces broadcast overhead even when the content-centric networking environment is implemented in the MANET, thereby enabling efficient communication. Further, it is possible to enhance the performance of the MANET.

In the node and method according to the inventive concept, some nodes among a plurality of nodes constituting a network are selected as relay nodes, so that an interest message and a data message are intensively transmitted via the relay nodes, thereby preventing channel confusion and collision.

Further, a publisher relay node is selected from the relay nodes, so that only the publisher node generates and broadcasts a multi-hop CA message flooded to the entire network, thereby reducing broadcast overhead of the network.

While the invention has been shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the inventive concept.

What is claimed is:

1. A method for communicating among a plurality of nodes in a content-centric networking environment, the method comprising:
    selecting, by each of a plurality of nodes, at least one relay node based on topology information on neighbor nodes adjacent within 2 hops from itself;
    determining, by each of the selected relay nodes, whether itself is a publisher relay node; and
    generating, by each of the determined publisher relay nodes, a multi-hop content announce (CA) message including content information of its own 1-hop neighbor nodes, and broadcasting the multi-hop CA message to the plurality of nodes through the selected relay nodes.

2. The method of claim 1, further comprising, before the selecting of the relay node, generating, by each of the plurality of nodes, the topology information based on a CA message received from at least one 1-hop neighbor node, and
    wherein the topology information includes information on the 1-hop neighbor nodes and information on 2-hop neighbor nodes connected through the 1-hop neighbor nodes.

3. The method of claim 2, wherein the CA message includes content information, identification information, cache-hit ratio information, node type information, hop count information and message type information with respect to the 1-hop neighbor nodes, and content information list, identification information list and node type information list with respect to the 2-hop neighbor nodes connected through the 1-hop neighbor nodes, and
    wherein the flooding hop scope of the CA message is limited to 1 hop.

4. The method of claim 1, wherein the selecting of the relay node comprises:
    (a) calculating, by each of the plurality of nodes, an MPRcost of each of its own 1hop neighbor nodes;

(b) selecting, by each of the plurality of nodes, as the relay node, a node having the greatest MPRcost among its own 1-hop neighbor nodes;
(c) removing, by each of the plurality of nodes, from the topology information, information on 2-hop neighbor nodes connected through the selected relay node among the information on its own 2-hop neighbor nodes; and
(d) repeating, by each of the plurality of nodes, (a) to (c) until the information on its own 2-hop neighbor nodes is entirely removed from the topology information.

5. The method of claim 4, wherein the MPRcost is calculated by the following Equation 1:

$$MPRcost(i)=(1-a)\cdot 2hRatio(i)+a\cdot CachehitRatio(i), \quad \text{Equation 1}$$

wherein i represents an i-th 1-hop neighbor node of an arbitrary node among the plurality of nodes, 2hRatio(i) represents a ratio between a number of 2-hop neighbor nodes of the arbitrary node and a number of 1-hop neighbor nodes belonging to the i-th 1-hop neighbor node, CachehitRatio(i) represents a content reply ratio between the entire content request number and the i-th 1-hop neighbor node, and a represents a weight coefficient (O:Sa:SI).

6. The method of claim 1, further comprising, between the selecting the relay node and the determining of whether each of the plurality of nodes is the publisher relay node, broadcasting, by each of the plurality of nodes, a CA message to which the selection result of the relay node is reflected to other nodes.

7. The method of claim 1, wherein the determining of whether each of the plurality of nodes is the publisher relay node comprises:
determining, by each of the selected relay nodes, whether another node selected as a relay node exists among its own 1-hop neighbor nodes;
when another node selected as the relay node exists, determining, by each of the selected relay nodes, itself as a publisher relay node when the number of its own 1-hop neighbor nodes is greater than or equal to that of 1-hop neighbor nodes of the other node selected as the relay node; and
when another node selected as the relay node does not exist, determining, by each of the selected relay nodes, itself as a publisher relay node.

8. The method of claim 1, wherein, after the broadcasting of the multi-hop CA message, when at least one relay node not determined as the publisher relay node among the selected relay nodes does not receive a multi-hop CA message from another publisher relay node for a predetermined time, the at least one relay node determines itself as the publisher relay node and broadcasts the multi-hop CA message to the plurality of nodes through the selected relay nodes.

9. The method of claim 1, wherein each of the determined publisher relay nodes generates the multi-hop CA message by collecting its own content information and content information of its own 1-hop neighbor nodes, and broadcasts the multi-hop CA message to the plurality of nodes through the selected relay nodes on behalf of its own 1-hop neighbor nodes.

10. The method of claim 1, wherein the multi-hop CA message includes content information, identification information, cache-hit ratio information, node type information, hop count information and message type information with respect to each of the determined publisher relay nodes, and content information list, identification information list and node type information list with respect to 1-hop neighbor nodes of each of the determined publisher relay nodes, and wherein the flooding hop scope of the multi-hop CA message is 2 hops or more.

11. The method of claim 1, wherein, after the broadcasting of the multi-hop CA message, when any one node receiving the multi-hop CA message among the plurality of nodes transmits an interest message for requesting a content, the node transmitting the interest message estimates a hop scope from the node transmitting the interest message to the node having the content indicated by the interest message based on content information and hop count information with respect to each node in the multi-hop CA message, and limits the flooding hop scope of the interest message based on the estimate hop scope.

12. A node for a content-centric network, the node comprising at least one processor and at least one memory to implement:
a topology information storage unit for storing topology information on neighbor nodes adjacent within 2 hops from the node;
a relay node selection unit for selecting at least one relay node among 1-hop neighbor nodes based on the topology information; and
a publisher relay node determination unit for determining whether the node is a publisher relay node broadcasting a multi-hop CA message on behalf of the 1-hop neighbor nodes.

13. The node of claim 12, wherein the topology information includes information on the 1-hop neighbor nodes and information on 2-hop neighbor nodes connected through the 1-hop neighbor nodes.

14. The node of claim 12, wherein the relay node selection unit calculates an MPRcost of each 1-hop neighbor nodes based on the topology information, and selects, as the relay node, a node having the greatest MPRcost among the 1-hop neighbor nodes, and
wherein the MPRcost is calculated based on at least one of the ratio between the number of 2-hop neighbor nodes of the node and the number of 1-hop neighbor nodes of each 1-hop neighbor node and the cache-hit ratio of each 1-hop neighbor node.

15. The node of claim 12, further comprising a CA message generation unit for generating a CA message,
wherein the CA message includes content information, identification information, cache-hit ratio information, node type information, hop count information and message type information with respect to the node, and content information list, identification information list and node type information list with respect to the 1-hop neighbor nodes.

16. The node of claim 12, wherein the publisher relay node determination unit determines the node as a publisher relay node, when another relay node exist among the 1-hop neighbor nodes, and the number of 1-hop neighbor nodes of the node is greater than or equal to that of 1-hop neighbor nodes of the other relay node or when another relay node does not exist among the 1-hop neighbor nodes as a case where the node receives a CA message to which the result obtained by selecting the node as a relay node from the 1-hop neighbor nodes is reflected.

17. The node of claim 16, wherein the publisher relay node determination unit determines the node as a publisher relay node, when the node does not receive a multi-hop CA message from another node for a predetermined time as a case where the node receives a CA message to which the result obtained by selecting the node as a relay node from the 1-hop neighbor nodes is reflected.

\* \* \* \* \*